United States Patent
Rusnak et al.

(10) Patent No.: US 7,334,183 B2
(45) Date of Patent: Feb. 19, 2008

(54) DOMAIN-SPECIFIC CONCATENATIVE AUDIO

(75) Inventors: Christopher Rusnak, Carlsbad, CA (US); Stephen Breitenbach, San Diego, CA (US); Joshua Bass, Carlsbad, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1055 days.

(21) Appl. No.: 10/449,207

(22) Filed: May 29, 2003

(65) Prior Publication Data

US 2004/0138887 A1 Jul. 15, 2004

Related U.S. Application Data

(60) Provisional application No. 60/440,309, filed on Jan. 14, 2003, provisional application No. 60/446,145, filed on Feb. 10, 2003, provisional application No. 60/449,078, filed on Feb. 21, 2003.

(51) Int. Cl.
*G06F 15/00* (2006.01)
*G10L 15/00* (2006.01)
*G10L 13/00* (2006.01)

(52) U.S. Cl. ............... 715/500.1; 715/531; 715/536; 704/251; 704/260

(58) Field of Classification Search ........... 715/500.1, 715/536, 531; 74/260, 251
See application file for complete search history.

(56) References Cited

U.S. PATENT DOCUMENTS

| | | | | |
|---|---|---|---|---|
| 5,278,943 A | * | 1/1994 | Gasper et al. | 704/200 |
| 6,570,555 B1 | * | 5/2003 | Prevost et al. | 345/156 |
| 6,862,568 B2 | * | 3/2005 | Case | 704/260 |
| 6,871,178 B2 | * | 3/2005 | Case et al. | 704/260 |
| 6,990,449 B2 | * | 1/2006 | Case | 704/260 |
| 2002/0103648 A1 | * | 8/2002 | Case et al. | 704/260 |
| 2004/0030554 A1 | * | 2/2004 | Boxberger-Oberoi et al. | 704/260 |
| 2005/0038653 A1 | * | 2/2005 | Roth et al. | 704/251 |
| 2005/0038657 A1 | * | 2/2005 | Roth et al. | 704/260 |
| 2005/0043949 A1 | * | 2/2005 | Roth et al. | 704/251 |
| 2005/0119897 A1 | * | 6/2005 | Bennett et al. | 704/270.1 |
| 2005/0159957 A1 | * | 7/2005 | Roth et al. | 704/276 |

OTHER PUBLICATIONS

Danlos, Laurence, et al., Synthesis of spoken messages from semantic representations: semantic-representation-to-speech system, International Conference On Computational Linguistics, Proceedings of the 11th conference on Computational linguistics, pp. 599-604, 1986.*

* cited by examiner

*Primary Examiner*—Rachna Singh
(74) *Attorney, Agent, or Firm*—Park, Vaughan & Fleming LLP

(57) ABSTRACT

One embodiment of the present invention provides a system for generating speech output from a text string. During operation, the system first receives the text string and then examines the text string to locate one or more substrings within the text string that are found in a speech library. Next, the system looks up speech files associated with the one or more substrings in the speech library. The system then concatenates these speech files to produce a speech output for a user.

24 Claims, 4 Drawing Sheets

| REMAINING STRING | | WORKING COPY | |
|---|---|---|---|
| MARY HAD A LITTLE LAMB ITS FLEECE WAS WHITE AS SNOW | 301 | MARY HAD A LITTLE LAMB. ITS FLEECE WAS WHITE AS SNOW | |
| | 302 | MARY HAD A LITTLE LAMB. ITS FLEECE WAS WHITE AS | |
| | 303 | MARY HAD A LITTLE LAMB. ITS FLEECE WAS WHITE | |
| | 304 | MARY HAD A LITTLE LAMB. ITS FLEECE WAS | |
| | 305 | MARY HAD A LITTLE LAMB. ITS FLEECE | |
| | 306 | MARY HAD A LITTLE LAMB. ITS | |
| | 307 | MARY HAD A LITTLE LAMB. | |
| | 308 | MARY HAD A LITTLE LAMB | => MARY.WAV |
| ITS FLEECE WAS WHITE AS SNOW | 309 | . ITS FLEECE WAS WHITE AS SNOW | |
| | 310 | . ITS FLEECE WAS WHITE AS | |
| | 311 | . ITS FLEECE WAS WHITE | |
| | 312 | . ITS FLEECE WAS | |
| | 313 | . ITS FLEECE | |
| | 314 | . ITS | |
| | 315 | . | => PAUSE.WAV |
| ITS FLEECE WAS WHITE AS SNOW | 316 | ITS FLEECE WAS WHITE AS SNOW | |
| | 317 | ITS FLEECE WAS WHITE AS | |
| | 318 | ITS FLEECE WAS WHITE | |
| | 319 | ITS FLEECE WAS | |
| | 320 | ITS FLEECE | |
| | 321 | ITS | => "ITS" |
| FLEECE WAS WHITE AS SNOW | 322 | FLEECE WAS WHITE AS SNOW | => FLEECE.WAV |

AUDIO OUTPUT: MARY.WAV + PAUSE.WAV + "ITS" + FLEECE.WAV

FIG. 3A

```
a = {"mary had a little lamb"        => "mary.wav",
     "fleece was white as snow"      => "fleece.wav",
     "little lamb her fleece was"    => "lamb.wav",
     "."                             => "pause.wav"};
```

FIG. 3B

DOMAIN-SPECIFIC CONCATENATIVE AUDIO

RELATED APPLICATION

This application hereby claims priority under 35 U.S.C. §119 to U.S. Provisional Patent Application No. 60/440,309, filed on 14 Jan. 2003, entitled "Concatenated Speech Server," by inventor Christopher Rusnak, and to U.S. Provisional Patent Application No. 60/446,145, filed on 10 Feb. 2003, entitled "Concatenated Speech Server," by inventor Christopher Rusnak. This application additionally claims priority under 35 U.S.C. §119 to U.S. Provisional Patent Application No. 60/449,078, filed on 21 Feb. 2003, entitled "Globalization of Voice Applications," by inventors Ashish Vora, Kara L. Sprague and Christopher Rusnak.

BACKGROUND

1. Field of the Invention

The present invention relates to voice interfaces for computer systems. More specifically, the present invention relates to a method and an apparatus that facilitates providing concatenative audio output from a computer system.

2. Related Art

Globalization of software applications is emerging as a business necessity in today's increasingly interconnected marketplace. This interconnectedness, coupled with a soft economy, provides a valuable opportunity to companies that can efficiently and effectively provide their software to the largest audience. Far too often, globalization is an afterthought in the application development cycle—composed of ad hoc processes and frameworks grafted onto the final stages of the implementation process. Companies that undertake a globalization effort in this ad hoc fashion are likely to rewrite their applications for each language, or worse, fail to ship software in multiple languages altogether.

Nowhere is this truer than in the speech technology world. The unique challenges posed by voice application development are daunting even for single-language development. Adding multiple languages to the mix and trying to maintain the ideal of a single code base and simultaneous shipment for all languages only makes the task harder. A variety of methods and processes exist to facilitate globalization of screen-based applications, but unfortunately, these methods and processes fall short (on their own) to address the needs of voice applications developers.

One challenge in globalizing voice application is generating language and locale-specific voice output from an application. The process of generating speech output from a computer typically involves using a text-to-speech (TTS) system to convert text to speech on a word-by-word basis.

Unfortunately, TTS systems have many drawbacks. The audio output from TTS systems is not realistic because words are disconnected and, quite often, are pronounced with improper inflection. This is because a TTS system does not use contextual information from the phrases that make up human speech to properly modulate pronunciation and inflection. An additional problem involves numbers, dates, times, and the like. A typical TTS system reads these data items as individual numbers rather than a coherent unit. For example, a typical TTS system may read "125" as one, two, five, rather than one hundred and twenty five.

A TTS system also tends to be language and locale-specific. Hence, an extensive rework is typically required to change the TTS system to a different locale. While many techniques exist to change visual interfaces from locale to locale, these methods are not available to developers of speech interfaces.

Hence, what is needed is a method and an apparatus for supplying realistic concatenative audio from a computer system without the drawbacks described above.

SUMMARY

One embodiment of the present invention provides a system for generating speech output from a text string. During operation, the system first receives the text string and then examines the text string to locate one or more substrings within the text string that are found in a speech library. Next, the system looks up speech files associated with the one or more substrings in the speech library. The system then concatenates these speech files to produce a speech output for a user.

In a variation of this embodiment, the speech library includes phrases related to a specific domain.

In a further variation, a substring can include a complete sentence.

In a further variation, a substring can include a phrase.

In a further variation, a substring can include a single word.

In a further variation, the concatenative audio files provide proper inflection for the speech output.

In a further variation, the system expands numbers, dates, and times while producing the speech output.

In a further variation, the speech library includes locale-specific speech files for multiple languages and locales.

In a further variation, a locale-specific speech file is spoken in a locale-specific version of a language.

In a further variation, locating the one or more substrings involves attempting to locate a longest possible substring in the text string.

DEFINITIONS

Concatenative: The act of connecting or linking in a series or chain.

BRIEF DESCRIPTION OF THE FIGURES

FIG. 3A presents the step by step process of parsing a text string in accordance with an embodiment of the present invention.

FIG. 3B presents the entries in a speech library in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Concatenative Audio System

Figure 1:
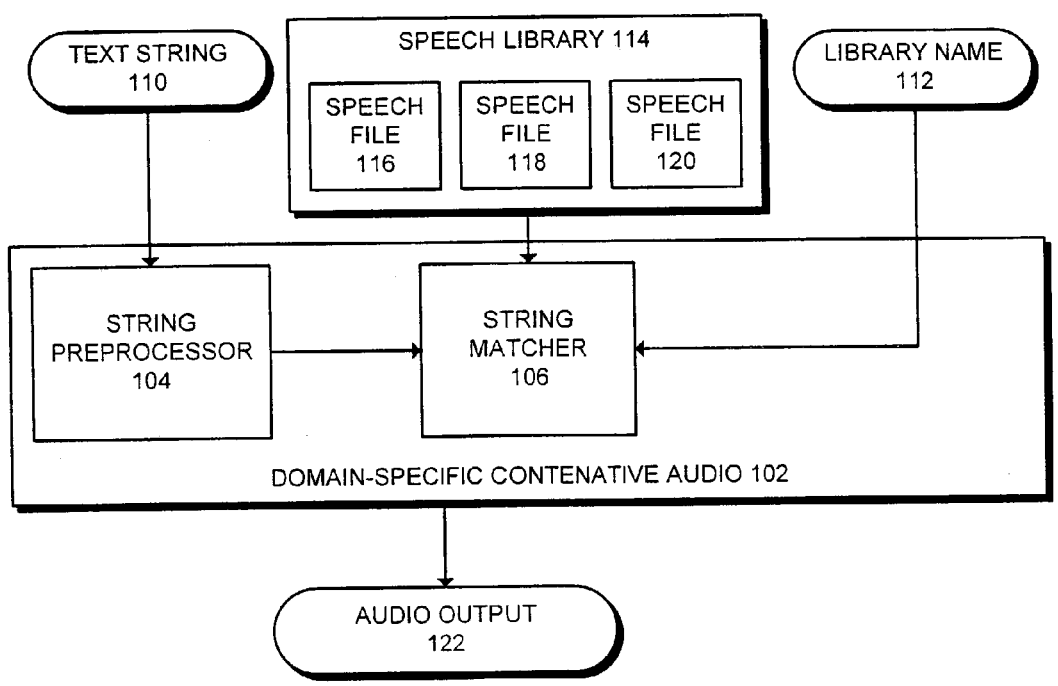
FIG. 1 illustrates a concatenative audio system in accordance with an embodiment of the present invention.

FIG. 1 illustrates a concatenative audio system in accordance with an embodiment of the present invention. The concatenative audio system includes domain-specific concatenative audio 102 and speech library 114. Domain-specific concatenative audio 102 can generally include any type of computer system, including, but not limited to, a computer system based on a microprocessor, a mainframe computer, a digital signal processor, a portable computing device, a personal organizer, a device controller, and a computational engine within an appliance.

Speech library 114 includes speech files 116, 118, and 120. Note that speech library 114 can include more of fewer speech files than are shown in FIG. 1. Speech library 114 can include any type of system for storing speech data in non-volatile storage. This includes, but is not limited to, systems based upon magnetic, optical, and magneto-optical storage devices, as well as storage devices based on flash memory and/or battery-backed up memory. Speech library 114 may be co-located with domain-specific concatenative audio 102 or may be located separately and accessed across a network (not shown), such as a corporate intranet or the Internet.

Domain-specific concatenative audio 102 includes string preprocessor 104, and string matcher 106. During operation, domain-specific concatenative audio 102 accepts a text string 110 to be converted into speech and library name 112, which specifies a library associated with a current domain and/or locale. A domain includes phrases common to a specific discipline; i.e. the weather, the stock market, the medical profession, etc. A locale-specific library includes phrases spoken in a locale-specific dialect of a language. It is this combination of domain and locale that ensures the invention provides concatenative audio with proper inflections and timings. Domain-specific concatenative audio 102 generates an audio output 122.

String preprocessor 104 accepts text string 110 and pre-processes text string 110 to expand numbers, dates, times, etc. and ensures that special symbols and punctuation are handled properly. The output of string preprocessor 104 is passed to string matcher 106 for parsing by identifying speech files from speech library 114 that contain phrases in text string 110. String matcher 106 also accepts library name 112 for locating speech files for the string matching processes. The process of matching strings from text string 110 to speech files from speech library 114 is discussed in detail below in conjunction with FIGS. 2 and 3.

Locating Substrings

Figure 2:
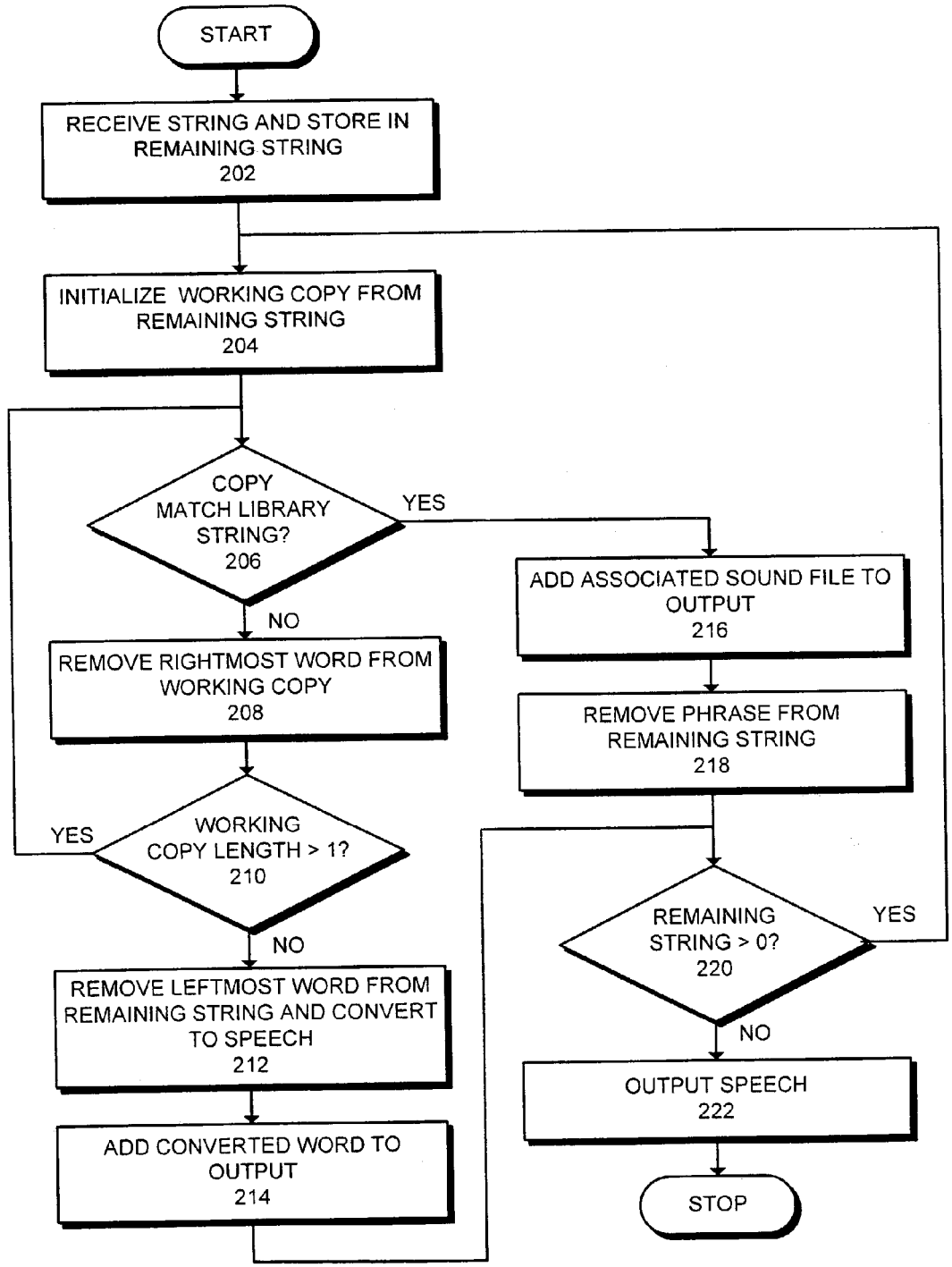
FIG. 2 presents a flowchart illustrating the process of locating substrings in accordance with an embodiment of the present invention.

FIG. 2 presents a flowchart illustrating the process of locating substrings in accordance with an embodiment of the present invention. The system starts by receiving a string and storing the string in a "remaining string" buffer, which is a storage area that holds the unmatched portion of the string (step 202). Next, the system initializes a "working copy" from the remaining string (step 204). The system then determines if the working copy matches a string from the library (step 206).

If the working copy does not match a string from the library, the system removes the rightmost word from the working copy (step 208). The system then determines of the length of the working copy is greater than one (step 210). If so, the process returns to step 206 to determine if the working copy now matches a library string.

If the working copy length is not greater than one at step 210, the system removes the leftmost word from the remaining string and converts this word to speech (step 212). Note that converting this word to speech typically involves a text to speech (TTS) conversion. The converted word is then added to the speech output (step 214).

If the working copy does match a library string at step 206, the system adds the associated sound file to the speech output (step 216). The system then removes the phrase from the remaining string (step 218). After removing the phrase from the remaining string at step 218, or after adding the converted word to the speech output at step 214, the system determines if the length of the remaining string is greater than zero (step 220). If so, the system returns to step 202 to process the remaining string. Otherwise, the system outputs the concatenative audio and terminates this process (step 222).

EXAMPLE

FIG. 3A presents the step-by-step process of parsing a text string in accordance with an embodiment of the present invention. This example illustrates the processing of the string "mary had a little lamb, its fleece was white as snow" as the system examines the string searching for substrings. FIG. 3B presents the strings and matching sound files in the library-library "a" in this example.

The system accepts the input string and stores the input string in "remaining string." Additionally, the system initializes "working copy" with a copy of the input string (step 301). The system then determines if the working copy matches any text string in library "a." Since there is no match in this case, the system removes the right hand word, "snow," from the working copy (step 302). The system continues in this manner removing words from the right and looking for a match. The system removes "as" (step 303), "white" (step 304), "was" (step 305), "fleece" (step 306), and "its" (step 307). Note that there is still not a match at step 307 because of the period after "lamb." The system then removes the period (step 308). The working copy now matches a line of text from library "a." The system provides "mary.wav" to the audio output.

After moving "mary.wav" to the output, the system removes the matched text from the remaining string and reinitializes the working copy from the remaining string (step 309). Note that the remaining string starts with the period. The system then continues looking for a match as above by removing "snow" (step 310), "as" (step 311), "white" (step 312), "was" (step 313), "fleece" (step 314), and "its" (step 315). At step 315, only the period remains which matches the file "pause.wav," which is moved to the audio output.

After moving "pause.wav" to the output, the system removes the period from the remaining string and reinitializes the working copy from the remaining string (step 316). The system then continues looking for a match as above by removing "snow" (step 316), "as" (step 317), "white" (step 318), "was" (step 319), and "fleece" (step 320). Note that this leaves the single word "its" in the working copy (step 321). Note also that "its" does not match any entry in library "a." In this case, the word "its" is converted by a TTS process and added to the audio output.

After adding "its" to the audio output, the system removes "its" from the remaining string and reinitializes the working copy from the remaining string (step 322). Since the working copy now matches "fleece.wav," "fleece.wav" is added to the audio output. After removing the working copy from the remaining string, the remaining string is empty. The system then supplies the audio output, which includes the concatenation of "mary.wav"+"pause.wav"+"its"+fleece.wav" and terminates the process.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating speech output of a text string, comprising:
   receiving the text string comprised of more than one word and storing the text string in a remaining string buffer holding an unmatched portion of the string;
   recursively repeating the following operations until the length of the text string in the remaining string buffer is not greater than zero:
      initializing a working copy of the text string from the remaining string buffer,
      comparing the working copy of the text string with strings in a speech library,
      removing a rightmost word from the working copy until the working copy of the text string matches a string in the speech library or until the length of the working copy of the text string is one,
      determining whether the length of the working copy of the text string is one and whether it matches a string in the speech library,
      when the length of the working copy of the text string is one and does not match a string in the speech library, removing the leftmost word from the text string in the remaining string buffer and converting the leftmost word into a sound file using a text to speech converter,
      when the working copy of the text string matches a string in the speech library, looking up an associated speech file for the text string in the speech library, and
      removing the matched text from the text string in the remaining string buffer;
   subsequent to the recursive operations, concatenating the speech files and any sound files together to produce a speech output for a user.

2. The method of claim 1, wherein the speech library includes phrases related to a specific domain.

3. The method of claim 1, wherein a text string can include a complete sentence.

4. The method of claim 1, wherein a text string can include a phrase.

5. The method of claim 1, wherein the concatenative audio files provide proper inflection for the speech output.

6. The method of claim 1, further comprising expanding numbers, dates, and times while producing the speech output.

7. The method of claim 1, wherein the speech library can include locale-specific speech files for multiple languages and locales.

8. The method of claim 7, wherein a locale-specific speech file is spoken in a locale-specific version of a language.

9. A computer-readable storage device storing instructions that when executed by a computer cause the computer to perform a method for generating speech output of a text string, the method comprising:
   receiving the text string comprised of more than one word and storing the text string in a remaining string buffer holding an unmatched portion of the string;
   recursively repeating the following operations until the length of the text string in the remaining string buffer is not greater than zero:
      initializing a working copy of the text string from the remaining string buffer,
      comparing the working copy of the text string with strings in a speech library,
      removing a rightmost word from the working copy until the working copy of the text string matches a string in the speech library or until the length of the working copy of the text string is one,
      determining whether the length of the working copy of the text string is one and whether it matches a string in the speech library,
      when the length of the working copy of the text string is one and does not match a string in the speech library, removing the leftmost word from the text string in the remaining string buffer and converting the leftmost word into a sound file using a text to speech converter,
      when the working copy of the text string matches a string in the speech library, looking up an associated speech file for the text string in the speech library, and
      removing the matched text from the text string in the remaining string buffer;
   subsequent to the recursive operations, concatenating the speech files and any sound files together to produce a speech output for a user.

10. The computer-readable storage device of claim 9, wherein the speech library includes phrases related to a specific domain.

11. The computer-readable storage device of claim 9, wherein a text string can include a complete sentence.

12. The computer-readable storage device of claim 9, wherein a text string can include a phrase.

13. The computer-readable storage device of claim 9, wherein the concatenative audio files provide proper inflection for the speech output.

14. The computer-readable storage device of claim 9, the method further comprising expanding numbers, dates, and times while producing the speech output.

15. The computer-readable storage device of claim 9, wherein the speech library can include locale-specific speech files for multiple languages and locales.

16. The computer-readable storage device of claim 15, wherein a locale-specific speech file is spoken in a locale-specific version of a language.

17. An apparatus for generating speech output of a text string, comprising:
   a processor;

a receiving mechanism configured to:
  receive the text string comprised of more than one word and store the text string in a remaining string buffer holding an unmatched portion of the string;
recursively repeating the following operations until the length of the text string in the remaining string buffer is not greater than zero:
  the receiving mechanism configured to initialize a working copy of the text string from the remaining string buffer,
  an examining mechanism configured to compare the working copy of the text string with strings in a speech library,
  an examining mechanism configured to remove a rightmost word from the working cony until the working copy of the text string matches a string in the speech library or until the length of the working copy of the text string is one,
  an examining mechanism configured to determine whether the length of the working copy of the text string is one and whether it matches a string in the speech library,
  an examining mechanism configured to remove the leftmost word from the text string in the remaining string buffer and convert the leftmost word into a sound file using a text to speech converter when the length of the working copy of the text string is one and does not match a string in the speech library,
  a lookup mechanism configured to look up an associated speech file for the text string in the speech library when the examining mechanism determines the working copy of the text string matches a string in the speech library, and
  removing the matched text from the text string in the remaining string buffer;
  subsequent to the recursive operations, a concatenating mechanism is configured to concatenate the speech files and any sound files together to produce a speech output for the user.

18. The apparatus of claim 17, wherein the speech library includes phrases related to a specific domain.

19. The apparatus of claim 17, wherein a text string can include a complete sentence.

20. The apparatus of claim 17, wherein a text string can include a single word.

21. The apparatus of claim 17, wherein the concatenative audio files provide proper inflection for the speech output.

22. The apparatus of claim 17, further comprising an expanding mechanism configured to expand numbers, dates, and times while producing the speech output.

23. The apparatus of claim 17, wherein the speech library can include locale-specific speech files for multiple languages and locales.

24. The apparatus of claim 23, wherein a locale-specific speech file is spoken in a locale-specific version of a language.

* * * * *